United States Patent [19]

Tillman, III

[11] 3,749,426

[45] July 31, 1973

[54] PIPE JOINT SEAL

[76] Inventor: Cassius Tillman, III, P.O. Box 343, Peters Rd., Harvey, La.

[22] Filed: July 31, 1972

[21] Appl. No.: 276,533

[52] U.S. Cl.............. 285/336, 277/225, 285/334.2, 285/363
[51] Int. Cl. ............................................ F16l 23/00
[58] Field of Search.................... 285/336, 363, 370, 285/371, 397, 398, 334.2; 277/225, 235 R

[56] References Cited
UNITED STATES PATENTS

| | | | |
|---|---|---|---|
| 3,507,506 | 4/1970 | Tillman............................ | 285/363 X |
| 3,217,922 | 11/1965 | Glasgow.......................... | 277/235 X |
| 1,921,978 | 8/1933 | Leary............................... | 285/398 X |
| 3,458,220 | 7/1969 | Rose et al........................ | 285/336 X |
| 3,490,777 | 1/1970 | Emmerson......................... | 277/235 |

*Primary Examiner*—Thomas F. Callaghan
*Attorney*—Herbert M. Birch, Anthony L. Birch et al.

[57] ABSTRACT

A pipe joint seal for pipes in the form of a tubular member having beveled ends is provided. The tubular member is adapted for disposition in recesses of aligned flanged pipes connected together under stressed conditions, such as bolts, studs or clamps. Outer annular marginal grooves near the ends of the tubular members are provided to form nose sections which concentrate distortion under stressed conditions of said tubular members at the ends thereof. The annular surface of the recesses in said pipes generally conform to the exterior shape of said tubular member in the area between said marginal grooves but slope away from the exterior of said tubular member in the region between said grooves and the ends of said tubular members, thereby forming an annular shoulder in alignment with said grooves. In a stressed condition the nose sections of said tubular member are constrained to conform to the shape of the recesses above and below said shoulders. The shoulders in conjunction with the conforming shape of the tubular members retard any axial movement of the respective pipes from the expansion of said bolts or any other means due to very high temperatures. The ends of the recesses may be blunt; or, alternatively, may be beveled to conform to the shape of the beveled ends of said tubular members.

9 Claims, 4 Drawing Figures

3,749,426

PIPE JOINT SEAL

This invention relates to a pipe joint sealing means for pipes which is an improvement over the pipe joint sealing means described in my prior U.S. Pat. No. Re 27,389 issued June 13, 1972. It is intended to incorporate by reference the subject matter of that patent herein.

The pipe joint sealing means of my foregoing mentioned patent suffers from the disadvantage that at extremely high temperatures the bolts or studs which hold the respective pipe flanges together tend to expand axially thus allowing the pipe flanges to part and weakening the seal at the pipe joint.

Accordingly, it is an object of the present invention to provide a pipe joint sealing means which will retard axial completion of the pipe sections due to axial expansion of the surrounding parts or other axial forces.

It is a further object of the present invention to provide a pipe joint seal which confines distortion under stressed conditions of the sealing means to end portions spaced from the location of the interface between the pipe sections.

A further object of the invention is the provision of such an improved seal which retains all advantages of the seal of my foregoing mentioned patent including reduced turbulence of fluid passing through the joint, antiventuri action, tight fitting, reduction of hazards of handling dangerous fluids, and the capability of installation without the use os special tools or equipment.

Still further objects, advantages and features of the invention will be apparent from the following description considered together with the accompanying drawing.

The present invention is intended for use with pipes having diameters in the range of from ⅛ inch to 6 inches. However, it may be used with pipes of larger diameters, if desired, without departing from the spirit and scope of this invention. The seal of the present invention has been tested to withstand pressures in the range of 6,000 pounds at 1,400° F. This provides a considerable advance over seals known in the prior art.

Figure 1:
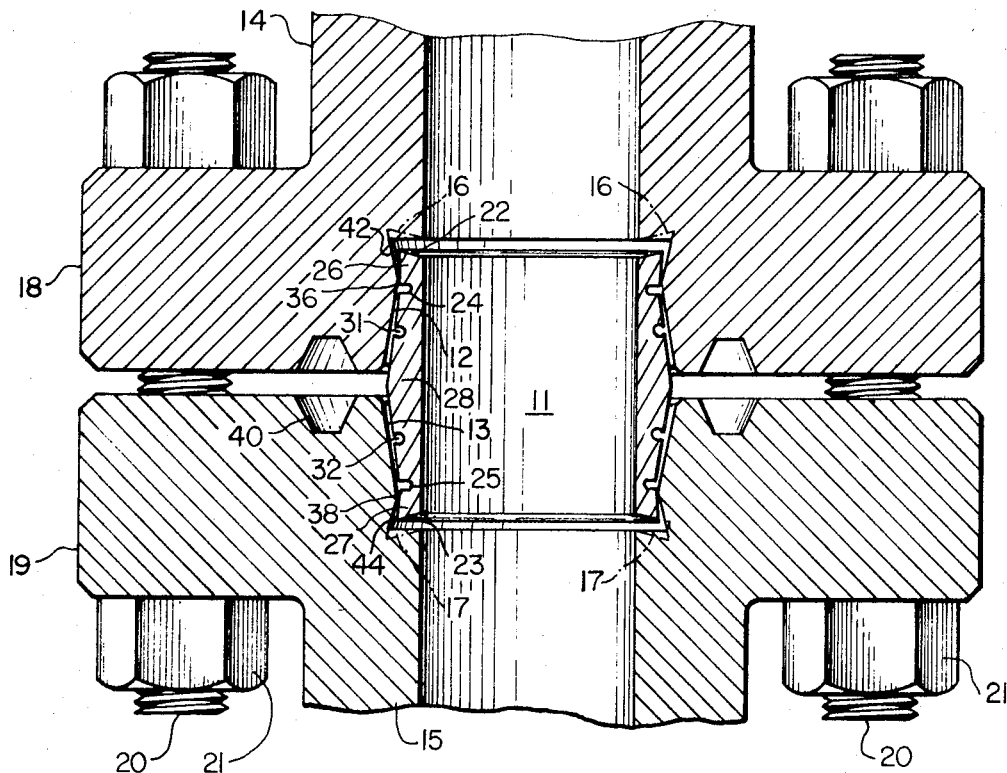
FIG. 1 is a cross-sectional view of the tubular sealing member of the present invention in an unstressed state.
Figure 2:
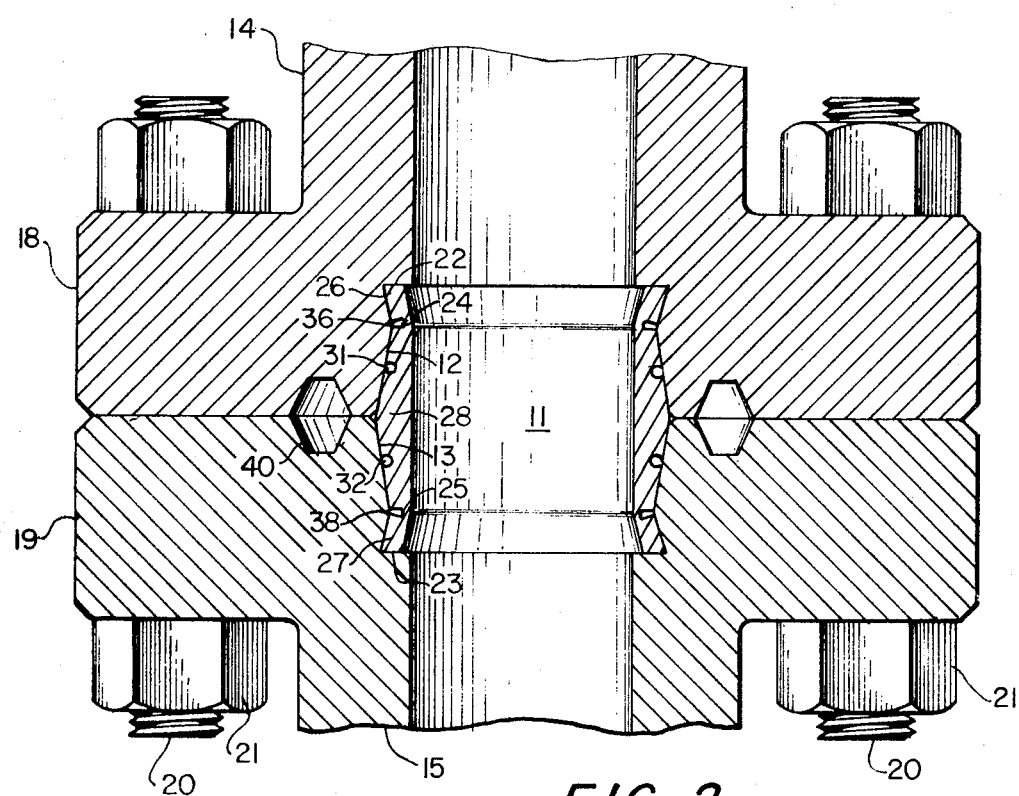
FIG. 2 is a cross-sectional view of the tubular sealing member of the present invention in a stressed state.
Figures 3, 4:
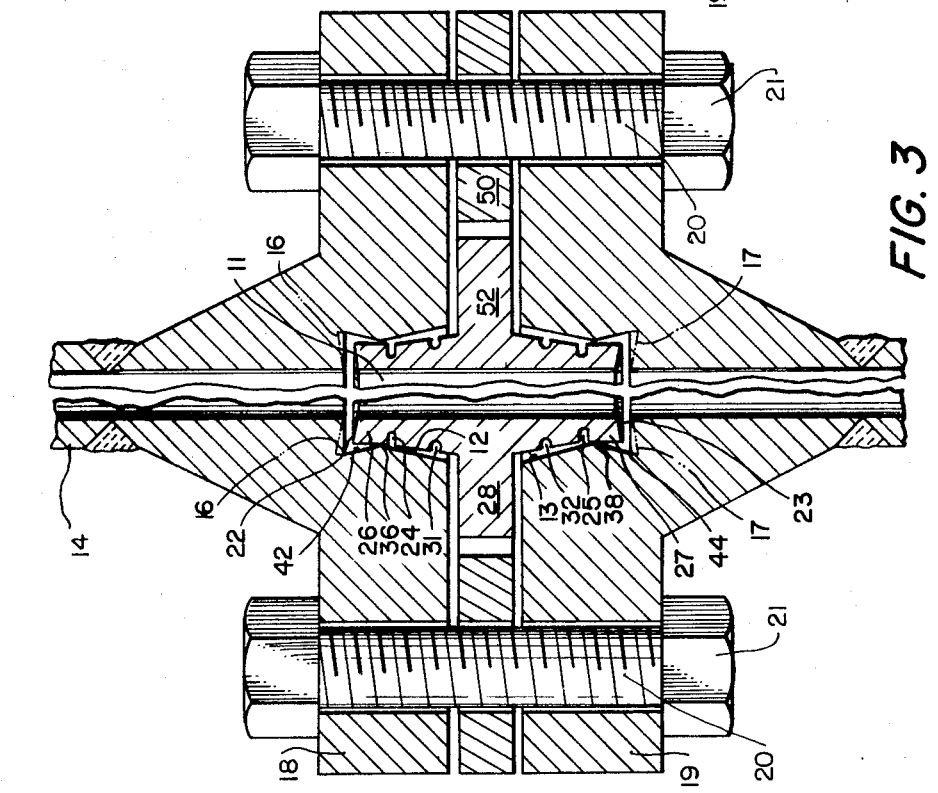
FIG. 3 is a second embodiment of the invention showing a collar formed with the tubular member adapted to be clamped between the flanges of the pipe seal.
FIG. 4 is a third embodiment of the invention showing shims or washers between the flanges of the pipe seal disposed about the stud means to prevent distortion of the flanges against the collar shown between the flanges.

Referring with more particularity to FIGS. 1 and 2 of the drawing, the embodiment illustrated comprises a tubular member 11 adapted to be disposed at either end in recesses 12 and 13 of aligned abutting pipes 14 and 15. The inner ends 16 and 17 of the recesses are either blunt or beveled at a suitable angle. The pipes typically contain flanges 18 and 19 by means of which the joint is tightened with conventional flange studs 20 and nuts 21. Other joint means may be used such as conventional unions or clamps not shown.

The tubular member 11 has the same internal diameter as that of the pipes 14 and 15 and is provided with beveled ends 22 and 23. Member 11 provides a flush surface at the seal to prevent turbulent flow or venturi action.

The combined lengths of the recesses 12 and 13 are somewhat less than that of the tubular member 11 so that when the joint is completed by tightening the nuts 21 on the studs 20, as shown in FIG. 2, longitudinal compressional pressure is exerted on the beveled ends of the tubular member. Recessed from either beveled end of the tubular member is an annular groove 24 and 25, respectively, to provide marginal nose sections 26 and 27, respectively, relatively more flexible than other parts of the member. By these means there is substantially prevented the transmission of distortion to the central section 28 of the member 11 under the compressional stress which might otherwise result from misalignment, machining variations or other factors. As will become more apparent hereinafter, nose sections 26 and 27 will also function to retard the longitudinal or axial expansion of pipe sections 14 and 15.

The annular surface of recesses 12 and 13 generally conform to the exterior shape of central section 28 of tubular member 11 in the area between marginal grooves 24 and 25 but slope away at a suitable angle from the exterior surface of tubular member 11 in the regions between grooves 24, 25 and beveled ends 22, 23, respectively, thereby forming annular shoulders 36, 38 substantially in alignment with grooves 24, 25, and annular pockets 42, 44. In a preferred embodiment the angle of slope is chosen at 10°. However, any suitable angle can be chosen without departing from the spirit and scope of the invention.

The inner ends 16 and 17 of recesses 12 and 13 are made slightly wider than corresponding nose sections 26 and 27 to allow for a degree of flexibility of the nose sections. This flexibility concentrates the longitudinal distortion of member 11 to nose sections 26 and 27 permitting an exact mutual engagement between central section 28 and the corresponding regions of recesses 12 and 13.

The surfaces of inner ends 16 and 17 of recesses 12 and 13 in one embodiment of the present invention are blunt. However, in situations where member 11 is formed of hard metal and the pipe sections 14 and 15 are formed of soft metal inner ends 16 and 17 are beveled, as shown in dotted lines in FIG. 1, to substantially conform to the shape of beveled ends 22 and 23 of member 11. This prevents the beveled ends 22 and 23 of member 11 from digging in and catching on inner ends 16 and 17.

In operation the tubular member 11 is first in an unstressed state as shown in FIG. 1. As nuts 21 or studs 20 are tightened inner ends 16 and 17 press on beveled ends 22 and 23 on member 11, respectively, and thereby cam or force nose sections 26 and 27 to be bent outwardly about grooves 24 and 25 to completely fill and conform to the shape of annular pockets 42 and 44 above and below shoulder means 36 and 38, respectively. Therefore, it can be seen that the shoulder means 36 and 38 in conjunction with nose sections 26 and 27, which are bent around said shoulder, prohibit or retard the axial movement of pipe sections 14 and 15. This is very important at extremely high temperatures since studs 20 tend to axially expand at these temperatures. However, with the pipe seal means of the present invention this expansion of studs 20 is retarded due to the conforming nature of member 11 about shoulders 36 and 38 of recesses 12 and 13.

Conventional surface seals (not shown) may be provided in grooves 31 and 32 of the central section 28 on either side of the joint line. In addition an O-ring seal may be provided in groove 40.

By these means it will be apparent that there is provided a stressed seal which yields to a degree under changes in the joint such as may be due to temperature, bending, etc. without interfering with the sealing of the joint. In addition the conforming nature of the seal about shoulders 36 and 38 retards any axial completion of pipe sections 14 and 15. It is to be understood, however, that the stressing of the seal member should always be within its elastic limit so as to permit it to function properly.

The tubular member 11 may be made of any suitable metal, such as steel, and may be coated with different types of plastic flow or elastic material such as Teflon, Hycar, rubber, plastic, etc. Alternatively, it may be coated with silver, lead, zinc, cadmium, copper, etc. to provide a redistributable surface and thereby a tighter joint. It will also be apparent that by the use of the tubular member 11 there is facilitated the bringing together of the ends of the pipes in proper alignment when making up the joint.

In another embodiment, as shown in U.S. Pat. Re No. 27,389 issued June 13, 1972, tubular member 11 may be provided with an external collar which extends between flanges 18 and 19. In that patent there is shown integral with the central section 28 of the tubular member 11 a collar 52 which extends outwardly between the flanges 18 and 19. When the studs 20 are tightened the collar 52 is secured between the flanges and results in stiffening the tubular member. Shims or washers 50 are disposed about the studs between the pipe flanges to prevent distortion of the flanges against the collar by the studs. Alternatively, as shown in the embodiment of FIG. 2, the collar may extend outwardly beyond the studs 20 and be provided with aligned apertures 53 for the studs.

The parts are so proportioned that the thickness of the collar 52 is less than the difference between the length of the tubular member 11 and the combined lengths of the recesses 12 and to a degree within the elastic limits of the parts stressed thereby.

This configuration may also be used with small sizes of pipe where design criteria of the adjoining parts make it desirable.

I claim:

1. A pipe seal comprising a tubular member and a joint of two axially aligned pipes, said pipes having corresponding recesses in their adjacent ends and means for closing the joint, said tubular member having beveled ends and being inserted in said recesses with the said beveled ends of the tubular member engaging end walls of the recesses, the length of said tubular member being greater than the combined lengths of said recesses, whereby the member is subjected to compressional stress on closure of the joint, said member having end portions delineated by marginal outer radially extending annular grooves to provide relatively resilient nose sections at said end portions under the compressional stress, said recesses including shoulder means in substantial alignment with said annular grooves, whereby said nose sections are bent about said shoulders due to said compressional stress to preclude axial movement of said pipes.

2. A pipe seal as defined in claim 1 wherein said beveled ends of said tubular member are sloped at such an angle that under compressional stress the ends of said recesses press against said beveled ends and cam said nose sections outwardly about said shoulder means in conformity with the shape of said recesses.

3. A pipe seal as defined in claim 2 wherein the ends of said recesses are sloped at substantially the same angle as the beveled ends of said tubular members.

4. A seal as defined by claim 1 in which the inside diameter of the tubular member is substantially the same as the inside diameter of the pipes.

5. A pipe seal as defined in claim 1 wherein said means for closing the joint comprises threaded studs passing through apertures in external flanges on the respective pipes.

6. A pipe seal as defined in claim 1 wherein said recesses include outwardly sloping annular pockets in the regions between said annular grooves and the ends of said recesses, one end of said pockets defining said shoulder means.

7. A pipe joint as defined by claim 1 and a stabilizing collar integral with the central section of the member, said collar extending radially outward, the thickness of the collar being less than the difference between the length of the tubular member and the combined lengths of the recesses.

8. A seal as defined by claim 7 in which the stabilizing collar extends outwardly a distance less than the studs and shim means between the pipe flanges adjacent said studs.

9. A seal as defined by claim 7 in which the collar extends outwardly beyond the studs, said collar having apertures aligned with the studs.

* * * * *